United States Patent [19]

Farnos et al.

[11] Patent Number: 5,589,147

[45] Date of Patent: * Dec. 31, 1996

[54] CATALYTIC SYSTEM FOR THE REDUCTON OF NITROGEN OXIDES

[75] Inventors: Maria D. Farnos, Wilmington, Del.; John P. McWilliams, Woodbury, N.J.; Sanjay B. Sharma, Langhorne, Pa.; David S. Shihabi, Pennington, N.J.

[73] Assignee: Mobil Oil Corporation, Fairfax, Va.

[ * ] Notice: The term of this patent shall not extend beyond the expiration date of Pat. No. 5,520,895.

[21] Appl. No.: 271,685

[22] Filed: Jul. 7, 1994

[51] Int. Cl.[6] .................................................. C01B 21/00
[52] U.S. Cl. .......................................................... 423/239.2
[58] Field of Search ........................ 423/239.2; 502/66, 502/68, 85, 71

[56] References Cited

U.S. PATENT DOCUMENTS

| | | | |
|---|---|---|---|
| 4,207,208 | 6/1980 | Lucki et al. | 252/455 |
| 4,595,702 | 6/1986 | Chu et al. | 518/713 |
| 4,631,267 | 12/1986 | Lachman et al. | 502/439 |
| 4,778,665 | 10/1988 | Krishnamurthy et al. | 423/239 |
| 4,867,954 | 9/1989 | Staniulis et al. | 423/239 |
| 4,961,917 | 10/1990 | Byrne | 423/239 |
| 5,024,981 | 6/1991 | Speronello et al. | 502/67 |
| 5,077,026 | 12/1991 | Nair et al. | 423/326 |
| 5,116,586 | 5/1992 | Baacke et al. | 423/239.2 |
| 5,173,278 | 12/1992 | Marler et al. | 423/239 |
| 5,248,643 | 9/1993 | Patil et al. | 502/67 |
| 5,254,322 | 10/1993 | Bhore et al. | 423/239.2 |
| 5,271,913 | 12/1993 | Iida et al. | 423/213.2 |
| 5,310,714 | 5/1994 | Grasseli et al. | 502/64 |

*Primary Examiner*—Michael Lewis
*Assistant Examiner*—Thomas G. Dunn, Jr.
*Attorney, Agent, or Firm*—Malcolm D. Keen; Gerald L. Harris

[57] ABSTRACT

There is presented a process for the treatment of exhaust gas, which process uses a specially prepared catalyst composition, for the selective catalytic reduction of $NO_x$ contained in the exhaust gas. An embodiment of the process of this invention comprises a catalytic stage to selectively catalytically reduce $NO_x$ over a catalyst composition comprising a molecular sieve that has been treated with a metal in a way effective to maximize metal dispersion. The catalyst of this invention typically comprises a silica, titania, or zirconia binder, e.g. a binder including a high molecular weight, hydroxyl functional silicone resin. The catalyst of this invention may be formed into a desired shape, e.g., by extrusion, and finished in a humidified atmosphere after forming.

11 Claims, No Drawings

CATALYTIC SYSTEM FOR THE REDUCTON OF NITROGEN OXIDES

FIELD OF THE INVENTION

This invention is concerned with the abatement of nitrogen oxides and, optionally, other undesirable compounds, in industrial and engine exhaust gases. In particular, it is concerned with a catalytic method for efficiently eliminating these undesirable compounds before discharge to the atmosphere. It is more particularly concerned with the use of a specially prepared catalyst comprising a molecular sieve that has been prepared from a physical mixture of the molecular sieve and the metal for the selective catalytic reduction of the $NO_x$ present in the exhaust gas.

BACKGROUND OF THE INVENTION

Although several nitrogen oxides are known which are relatively stable at ambient conditions, it is generally recognized that two of these, viz. nitric oxide (NO) and nitrogen dioxide ($NO_2$), are the principal contributors to smog and other undesirable environmental effects when they are discharged into the atmosphere. These effects will not be discussed further here since they are well recognized and have led various governmental authorities to restrict industrial emissions in an attempt to limit the level of the oxides in the atmosphere. Nitric oxide and nitrogen dioxide, under appropriate conditions, are interconvertible according to the equation.

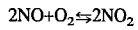

$$2NO + O_2 \rightleftharpoons 2NO_2$$

For purposes of the present invention, $NO_x$ will be used herein to represent nitric oxide, nitrogen dioxide, and nitrous oxide, as well as mixtures containing these gases.

Formation of man-made nitrogen oxides from the elements occurs in the high temperature zones of combustion processes. The internal combustion engine, and coal or gas-fired or oil-fired furnaces, boilers and incinerators, all contribute to $NO_x$ emissions. In general, fuel-rich combustion mixtures produce exhaust gases with lower contents of $NO_x$ than do lean mixtures. Although the concentrations of $NO_x$ in the exhaust gases produced by combustion usually are low, the aggregate amount discharged in industrial and/or highly populated areas tends to cause problems. Other industrial sources of $NO_x$ also exist. These are associated with the manufacture of nitric acid, with nitration of organic chemicals, and with other chemical operations such as the reprocessing of spent nuclear fuel rods by dissolution in nitric acid to recover uranyl nitrate followed by calcination to convert the nitrate to uranium oxide. In these instances the waste gases may contain relatively high levels of $NO_x$, approaching 3%.

The so-called "stable" nitrogen oxides have in common the somewhat peculiar property that although they are thermodynamically unstable with respect to decomposition into elemental oxygen and nitrogen, no simple, economical method has been described for inducing this decomposition. It has been discovered, however, that the addition of a reductant such as ammonia to the exhaust gas, under appropriate reaction conditions, converts $NO_x$ to elemental nitrogen and steam and denitrifies the exhaust gas.

The process of contacting an industrial flue gas with a catalyst in the presence of ammonia at a temperature in the range of about 200°–600° C. to denitrify the flue gas has come to be known as the process for Selective Catalytic Reduction (SCR) of $NO_x$. In order to avoid confusion, any reference made herein to "Selective Catalytic Reduction," or to "SCR," is intended to refer to a process in which a mixture of $NO_x$ and $NH_3$ are induced to react catalytically at elevated temperatures. The term "denitrify" as used herein, means to reduce the amount of one or more noxious nitrogen compounds (such as NO, $NO_x$ and HCN) contained in a waste gas, preferably by conversion to nitrogen gas.

The use of zeolite-based catalysts for the SCR of nitrogen oxides with ammonia is well established. For example, U.S. Pat. No. 4,220,632 to Pence et al. discloses a process for reducing noxious nitrogen oxides from a fossil-fuel-fired power generation plant, or from other industrial plant off-gas streams, to elemental nitrogen and/or innocuous nitrogen oxides employing ammonia as the reductant and, as the catalyst, the hydrogen or sodium form of a zeolite having pore openings of about 3 to 10 Angstroms.

U.S. Pat. No. 5,173,278 to Marler et al. discloses an SCR process where the ammonia needed for the reduction of $NO_x$ is generated, at least in part, by hydrolysis of HCN over a supported transition metal and/or a crystalline zeolite catalyst. The process described in this patent appears to require that HCN be present.

In particular, it is known that the hydrogen form of ZSM-5 (HZSM-5) is well suited for this reaction at temperatures between about 400°–500° C. U.S. Pat. No. 4,778,665 to Krishnamurthy et al. describes an SCR process for pretreating industrial exhaust gases contaminated with $NO_x$ in which the catalyst has a silica to alumina ratio of at least about 20 and a Constraint Index of 1 to 12. The entire contents of this patent are incorporated herein by reference as if fully set forth.

At temperatures below about 400° C., HZSM-5 is significantly less efficient at removing nitrogen oxides from the gas stream.

BRIEF SUMMARY OF THE INVENTION

One embodiment of this invention is a method for treating an exhaust gas comprising $NO_x$ and ammonia, said method comprising directing the exhaust gas along with a source of oxygen over a catalyst under treating conditions effective for the selective catalytic reduction of $NO_x$; said catalyst comprising a molecular sieve which has been physically mixed with a metal and a binder or binder precursor under contacting conditions effective to produce a metal loading with reference to the molecular sieve of about 0.01 wt. % to about 5 wt. %; said binder or binder precursor comprising at least one selected from the group consisting of titania, zirconia, and silica; said catalyst having been finished in a humidified atmosphere.

Another embodiment of this invention is a method for treating an exhaust gas comprising $NO_x$ and ammonia, said method comprising directing the exhaust gas along with a source of oxygen over a catalyst composition under treating conditions effective for the selective catalytic reduction of $NO_x$; said catalyst composition having been prepared by physically admixing into one formable mass:

(a) a molecular sieve;

(b) a metal oxide;

(c) a silicone resin;

(d) a methyl cellulose; and (e) at least one carrier selected from the group consisting of methanol, ethanol, isopropyl alcohol, N-methyl pyrrolidone, dibasic ester, water and mixtures thereof;

said catalyst composition further having been formed into a desired shape, said catalyst composition still further having been finished in a humidified atmosphere after being formed.

Yet another embodiment of this invention is a method of making a catalyst composition suitable for the selective catalytic reduction of $NO_x$ comprising: producing a formable mass by physically admixing (a) a molecular sieve;

(b) a metal;

(c) a silicone resin;

(d) a methyl cellulose; and (e) at least one suitable carrier selected from the group consisting of methanol, ethanol, isopropyl alcohol, N-methyl pyrrolidone, dibasic ester, water and mixtures thereof;

extruding the formable mass into a desired shape, and then finishing the extruded shape in a humidified atmosphere.

DETAILED DESCRIPTION

The term "exhaust gas" as used herein means any waste gas which is formed in an industrial process or operation and which is normally disposed of by discharge to the atmosphere, with or without additional treatment. "Exhaust gas" also includes the gas produced by internal combustion engines. The composition of such a gas varies and depends on the particular process or operation which leads to its formation. When formed in the combustion of fossil fuels, it will generally comprise nitrogen, steam and carbon dioxide in addition to low levels, such as up to about 1000 ppm, of nitric oxide plus nitrogen dioxide. Sulfur-containing fuels will typically produce an exhaust gas that contains one or more sulfur oxides, such as $SO_2$. Rich fuel-air mixtures will generally produce an exhaust gas that contains little if any free oxygen along with some carbon monoxide, hydrocarbons, and hydrogen. Lean fuel-air mixtures, i.e., mixtures in which more air is provided than is stoichiometrically required to completely burn the fuel, will form an exhaust gas that contains gaseous oxygen. The foregoing is a general description given to illustrate the variability in the composition of the exhaust gases from fossil fuel combustion. Other industrial processes such as nitration, uranium recovery, and calcining nitrate salt containing solids produce exhaust gases which can have compositions different from those noted above. They may be substantially devoid of steam, for example, and may contain very high concentrations of nitrogen or other inert gases.

The conversion of $NO_x$ to $N_2$ is believed to proceed generally according to equations (1) and (2).

$$2NO_2 + 4NH_3 + O_2 \rightarrow 3N_2 + 6H_2O \qquad (1)$$

$$4NO + 4NH_3 + O_2 \rightarrow 4N_2 + 6H_2O \qquad (2)$$

This invention is effective for treating exhaust gas containing the approximate stoichiometric amount of ammonia. The ammonia may be present in the gas, may be added to the gas, or may be produced by an upstream process. As used herein, the expression "approximate stoichiometric amount of ammonia" is intended to mean about 0.75 to about 1.25 times the molar amount of ammonia indicated in equations (1) and (2) when excess oxygen is present.

The catalyst of this invention provides significantly improved SCR activity at relatively low temperatures, e.g., below about 400° C. Additionally, little or no ammonia oxidation is observed at higher temperatures, e.g., above about 500° C., such as has been seen with other metal containing catalysts when used for the SCR of $NO_x$.

According to the method of this invention, any carbon monoxide and hydrocarbons present in the exhaust gas may be oxidized to carbon dioxide and water over the catalyst. Additionally, hydrocarbons may be selectively absorbed/adsorbed on the catalyst.

One embodiment of the invention is a method for treating a gas mixture comprising $NO_x$, ammonia, and, optionally, at least one of CO and a hydrocarbon and mixtures thereof, said method comprising directing the gas mixture along with a source of oxygen over a catalyst under conditions effective for the selective catalytic reduction of $NO_x$, said catalyst comprising a molecular sieve, which has had a metal added under conditions effective to provide maximum metal dispersion, e.g., by physically contacting the molecular sieve with a metal, said catalyst having been finished in a humidified atmosphere, and said catalyst optionally further comprising a binder.

In another embodiment of the invention, a water insoluble metal oxide, e.g., iron oxide ($Fe_2O_3$), and a molecular sieve, e.g., ZSM-5, are physically mixed in the presence of a binder precursor, such as a silicone resin, and the mixture is formed into a desired shape, such as by extrusion, and the formed shape is dried and then finished in a humidified atmosphere.

Each of the principal features of this invention will be more fully described below.

Feeds

This invention is effective to treat industrial and engine exhaust gases to remove $NO_x$, and optionally other undesirable compounds, such as CO and hydrocarbons, if present. These exhaust gases are typically produced in internal combustion engines, and coal or gas-fired or oil-fired furnaces, boilers and incinerators, and by the manufacture of nitric acid, by the nitration of organic chemicals, and by other chemical operations such as the reprocessing of spent nuclear fuel rods by dissolution in nitric acid to recover uranyl nitrate followed by calcination to convert the nitrate to uranium oxide.

Process Conditions

The exhaust gas is typically treated in the catalytic system of this invention at a temperature of about 200° C. to about 1,000° C. or more, e.g. within the range of about 225° C. to about 900° C., e.g. of about 225° C. to about 750° C., e.g. of about 250° C. to about 600° C. and at a gas hourly space velocity, GHSV, (vols. of gas at STP per volume of catalyst per hour) adjusted to provide the desired conversion. The GHSV can be from about 1,000 to about 500,000 $hr^{-1}$, e.g. within the range of about 2,500 to about 250,000 $hr^{-1}$, e.g. of from about 5,000 to about 150,000 $hr^{-1}$, e.g. of from about 10,000 to about 100,000 $hr^{-1}$. The process of this invention is operable at subatmospheric to superatmospheric pressure, e.g. at about 5 to about 500 psia, e.g. at about 10 to about 50 psia, i.e. near or slightly above atmospheric pressure.

The gas mixture directed over the catalyst should contain at least a stoichiometric amount of oxygen as indicated by equations (1) and (2) above. Excess levels of oxygen above the stoichiometric amount are desirable. If sufficient oxygen is not present in the exhaust gas, a source of oxygen, e.g. air, may be added to the exhaust gas, and if sufficient oxygen is present in the exhaust gas, no air need be added to the exhaust gas.

Adequate conversion may be readily achieved with a simple stationary fixed-bed of catalyst. However, other contacting means are also contemplated, such as contacting with a fluid bed, a transport bed, and a monolithic catalyst structure such as a honeycomb.

Suitable mixing may be used before the catalytic stage of this invention to produce a homogeneous gas mixture for reaction in that stage. The mixers may be any suitable arrangement, including, for example, baffles, discs, ceramic discs, static mixers or combinations of these.

Catalyst Composition

Catalysts useful in this invention typically comprise an active material and a support or binder. The support for the catalysts of this invention may be the same as the active material and further can be a synthetic or naturally occurring substance as well as an inorganic material such as clay, silica and/or one or more metal oxides. The latter may be either naturally occurring or in the form of gelatinous precipitates or gels including mixtures of silica and metal oxides. Naturally occurring clays which can be used as support for the catalysts include those of the montmorillonite and kaolin families, which families include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification. In addition to the foregoing materials, the catalysts of this invention may be supported on a porous binder or matrix material, such as titania, zirconia, silica-magnesia, silica-zirconia, silica-thoria, silica-berylia, silica-titania, titania-zirconia, as well as a ternary compound such as silica-magnesia-zirconia. A mixture of these components could also be used. The support may be in the form of a cogel. One binder that is suitable is a low acidity titania prepared from a mixture comprising a low acidity titanium oxide binder material and an aqueous slurry of titanium oxide hydrate. Other binders include alumina and alumina-containing materials such as silica-alumina, silica-alumina-thoria, silica-alumina-zirconia, and silica-alumina-magnesia. Typical aluminas include alpha ($\alpha$) alumina, beta ($\beta$) alumina, gamma ($\gamma$) alumina, chi-eta-rho ($\chi,\eta,\rho$) alumina, delta ($\delta$) alumina, theta ($\theta$) alumina, and lanthanum beta ($\beta$) alumina. The preferred support is one that is a high surface area material that also possesses a high temperature stability and further possesses a high oxidation stability.

The binder may be prepared according to application U.S. Ser. No. 08/112,501, now U.S. Pat. No. 5,430,000 incorporated by reference herein, or may be prepared according to methods disclosed in U.S. Pat. Nos. 4,631,267; 4,631,268; 4,637,995; and 4,657,880, each incorporated by reference herein. Also, the catalysts described herein may be combined with any of the binder precursors described in the above application and patents, and then may be formed, such as by extrusion, into the shape desired, and then finished in a humidified atmosphere as hereinafter described. The preferred binder is substantially free of alumina. By the term "substantially free of alumina" is meant that no alumina is intentionally added to the binder, however, it is recognized that trace amounts of alumina may be present.

When low acidity titania is used as a binder, it is desirable that the formable, e.g., extrudable, mass prepared by combining the zeolite, the iron salt, and the titania binder precursors contain at least about 0.5 wt. %, typically from about 1 wt. % to about 20 wt. %, e.g., from about 2 to about 8 wt. % of the aqueous slurry of titanium oxide hydrate.

The low acidity titania is typically added in dry particulate form, e.g., titanium oxide hydrate, so as to control the moisture content of the binder/dispersant mixture at a level to promote satisfactory forming, e.g., extrusion.

The catalysts may also contain stabilizers such as alkaline earth oxides, phosphates and combinations thereof.

Catalysts of this invention are frequently used with a substrate. A material can be both substrate and part of the catalyst. Suitable substrate materials include cordierite, nitrides, carbides, borides, intermetallics, mullite, alumina, natural and synthetic zeolites, lithium aluminosilicate, titania, feldspars, quartz, fused or amorphous silica, clays, aluminates, zirconia, spinels, or metal monoliths of aluminum-containing ferrite type stainless steel, or austenite type stainless steel, and combinations thereof. Typical substrates are disclosed in U.S. Pat. Nos. 4,127,691 and 3,885,977, incorporated by reference herein. The catalyst may be combined with the substrate in any method that ensures that the catalyst will remain intact during the catalytic reaction. For example, the catalyst may be present as a coating on the substrate, or it can be present as an integral part of the substrate. Additionally, as mentioned earlier, the substrate and at least part of the catalyst may be the same. For example, in some embodiments, zeolites may be used as both catalysts and substrates. When the catalyst of this invention is deposited on the substrate, it may be done using a wash coat. The wash coat may be prepared, for example, by adding silica sol and water to the catalyst powder, mulling the mixture to form a thixotropic slurry, dipping the monolithic substrate into the slurry, and then drying and calcining the resulting structure. Alternatively, the catalyst may be formed and extruded together with the substrate and thus may become an integral part of the substrate.

The form and the particle size of the catalyst is not critical to the present invention and may vary depending, for example, on the type of reaction system employed. Non-limiting examples of the shapes of the catalyst for use in the present invention include balls, pebbles, spheres, extrudates, channeled monoliths, honeycombed monoliths, microspheres, pellets or structural shapes, such as lobes, pills, cakes, honeycombs, powders, granules, and the like, formed using conventional methods, such as extrusion or spray drying. Where, for example, the final particles are designed for use as a fixed bed, the particles may be formed into particles having a minimum dimension of at least about 0.01 inch and a maximum dimension of up to about one-half inch or one inch or more. Spherical particles having a diameter of about 0.03 inch to about 0.25 inch, e.g., about 0.03 inch to about 0.15 inch, are often useful, especially in fixed bed or moving bed operations. With regard to fluidized bed systems, the major amount by weight of the particles may have a diameter in the range of about 10 microns to about 250 microns, e.g., about 20 microns to about 150 microns.

The gas mixture, as described above, is contacted with a catalyst comprising a molecular sieve catalyst having the properties described below. The molecular sieve useful in this invention is not limited to any particular molecular sieve material and, in general, includes all metallosilicates, metallophosphates, silicoaluminophosphates, and layered and pillared layered materials, which effectively catalyze the selective catalytic reduction reaction of the present invention. Particularly useful are the aluminosilicates whether or not previously dealuminized to increase the framework silica:alumina ratio. Typical zeolites include ZSM-4 (Omega), ZSM-5, ZSM-11, ZSM-12, ZSM-20, ZSM-22, ZSM-23, ZSM-35, ZSM-48, ZSM-50, ZSM-57, ZSM-58, MCM-22, PSH-3, Beta, X, Y, and L, as well as ferrierite, mordenite, dachiardite, clinoptilolite, offretite, erionite, gmelinite, chabazite, etc. Other molecular sieves contemplated include, for example, MCM-9, VPI-5, MCM-20, SAPO-11, SAPO-17, SAPO-34, SAPO-37, and MCM-41. Particularly useful are the intermediate pore size zeolites, e.g., those less than about 7 Angstroms pore size, such as from about 5 to less than about 7 Angstroms, e.g., those which have a Constraint Index between about 1 and about 12.

It is to be understood that the identification of the molecular sieves, e.g., zeolites, may be resolved on the basis of their respective X-ray diffraction patterns. The present invention contemplates utilization of such molecular sieves wherein the mole ratio of silica-to-metal oxide is essentially unbounded. The molecular sieves are not limited to specific silica:metal oxide mole ratios and, yet, having the same crystal structure as the disclosed materials, may be useful or even preferred in some applications. It is the crystal structure, as identified by the X-ray diffraction "fingerprint," which establishes the identity of the specific molecular sieve, e.g., zeolite, material.

Examples of intermediate pore size zeolites include ZSM-5 (U.S. Pat. No. 3,702,886 and Re. 29,948); ZSM-11 (U.S. Pat. No. 3,709,979); ZSM-12 (U.S. Pat. No. 3,832,449); ZSM-21 (U.S. Pat. No. 4,046,859); ZSM-22 (U.S. Pat. No. 4,556,477); ZSM-23 (U.S. Pat. No. 4,076,842); ZSM-35 (U.S. Pat. No. 4,016,245); ZSM-38 (U.S. Pat. No. 4,406,859); ZSM-48 (U.S. Pat. No. 4,397,827); ZSM-57 (U.S. Pat. No. 4,046,685); and ZSM-58 (U.S. Pat. No. 4,417,780). The entire contents of the above references are incorporated by reference herein.

A characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure typically have a size such as would be provided by 10-membered rings of oxygen atoms. It is to be understood, of course, that these rings are those formed by the regular disposition of the tetrahedra making up the anionic framework of the molecular sieve, the oxygen atoms themselves being bonded to the silicon or aluminum atoms at the centers of the tetrahedra.

The intermediate pore size zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not an intermediate pore size material. Windows of 10-membered rings are preferred, although in some instances excessive puckering of the rings or pore blockage may render these zeolites ineffective.

Rather than attempt to judge from crystal structure whether or not a zeolite possesses the necessary constrained access to molecules larger than normal paraffins, a simple determination of the Constraint Index may be made. The method by which Constraint Index is determined is described fully in U.S. Pat. No. 4,016,218, incorporated herein by reference for details of the method. Constraint Index (CI) values for some typical zeolites including some which are suitable as catalysts in the process of this invention are as follows:

| | CI (at test temperature) | |
|---|---|---|
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |

-continued

| | CI (at test temperature) | |
|---|---|---|
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-48 | 3.5 | (538° C.) |
| ZSM-50 | 2.1 | (427° C.) |
| MCM-22 | 0.6–1.5 | (399° C.–454° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The above-described Constraint Index is one definition of those intermediate pore size zeolites which are useful in the process of the present invention. The very nature of this parameter and the above-referenced procedure by which it is determined, however, admits of the possibility that a given zeolite can be tested under somewhat different conditions and thereby exhibit different Constraint Indices. Constraint Index appears to vary somewhat with the severity of the conversion operation and the presence or absence of support material. Similarly, other variables such as crystal size of the zeolite, the presence of occluded contaminants, etc., may affect the observed Constraint Index value. It will therefore be appreciated that it may be possible to select test conditions, e.g., temperature, as to establish more than one value for the Constraint Index of a particular zeolite. This explains the range of Constraint Indices for some zeolites, such as ZSM-5, ZSM-11, MCM-22, and Beta.

The catalyst may include a support and may be used with a substrate. In accordance with one embodiment, the catalyst may be brought into contact with a monolithic ceramic substrate by crystallizing the zeolite on the surface of the substrate, as disclosed in U.S. Pat. No. 4,800,187, incorporated herein by reference. The catalyst may also be formed into the substrate, such as by extrusion.

A catalyst that is useful in the process of this invention is prepared by combining into a single mixture a zeolite, such as the hydrogen form of ZSM-5, a metal oxide, such as iron oxide ($Fe_2O_3$), a high molecular weight, hydroxy functional silicone, such as Dow Corning Q6-2230 silicone resin, a suitable extrusion aid, such as methyl cellulose, and a suitable polar, water soluble carrier, such as methanol, ethanol, isopropyl alcohol, N-methyl pyrrolidone or a dibasic ester along with water as needed, then forming the mixture into the desired shape, such as by extrusion, then finishing the formed material by treating it in a humidified atmosphere. One particular methyl cellulose that is effective as an extrusion aid in the method of this invention is a hydroxypropyl methyl cellulose, such as K75M Methocel™, available from Dow Chemical Co. Dibasic esters that are useful in this invention include dimethyl glutarate, dimethyl succinate, dimethyl adipate, and mixtures thereof, one example of which is E. I. DuPont de Nemours & Co. DBE, which typically comprises about 50 to 75 percent dimethyl glutarate, 10 to 25 percent dimethyl adipate, 19 to 26 percent dimethyl succinate and less than about 0.2 wt. % methanol. Other silicone resins that may be used in the method of this invention include those described in U.S. Pat. No. 3,090,691.

The relative proportions of molecular sieve component and the support material on an anhydrous basis may vary widely with the zeolite content ranging from between about 5 to about 99 percent by weight and more usually in the range of about 10 to about 95 percent by weight, e.g., from about 20 to about 90 percent by weight of the dry composite.

Original ions, e.g., alkali or alkaline earth metal, of the as-synthesized molecular sieve and any found in the molecular sieve/support material can be replaced in accordance with techniques well known in the art, at least in part, by ion-exchange with other ions. For the present catalyst composition, potential replacing ions include hydrogen ions and hydrogen precursor, e.g., ammonium ions. ZSM-5 in the hydrogen exchanged form is referred to herein as HZSM-5. Typical ion-exchange techniques would be to contact the molecular sieve or molecular sieve/support material with a solution containing a salt of the desired replacing ion or ions. Examples of such salts include the halides, e.g., chlorides, nitrates and sulfates. Representative ion-exchange techniques are disclosed in a wide variety of patents including U.S. Pat. Nos. 3,140,249; 3,140,251; and 3,140,253, incorporated by reference herein.

The desired metal loading on the molecular sieve component of the catalyst is that amount effective to yield about 0.01 to about 5 wt. %, e.g. within this range of at least about 0.4 wt. %, e.g., at least about 0.6 wt. %, e.g., at least about 1 wt. %, e.g., at least about 1.5 wt. %, e.g., about 2 wt. %, elemental metal based upon the molecular sieve. Potential metals include one or more of those metals, such as transition metals, possibly a noble metal, which are able to oxidize other undesirable compounds present in the exhaust gas along with promoting the SCR of $NO_x$. The metal is typically selected from at least one of the metals of Groups of the Periodic Table IIIA, IB, IIB, VA, VIA, VIIA, VIIIA, and combinations thereof. Examples of these metals include at least one of copper, zinc, vanadium, chromium, manganese, cobalt, iron, nickel, rhodium, palladium, platinum, molybdenum, tungsten, cerium and mixtures thereof. An example of a subset of these metals is one or more of the noble metals, platinum, palladium and combinations of these, along with iron and cerium. The above described metals may be used individually and in combination with each other. The term "metal" as used herein is intended to include the elemental metal as well as metal oxides, metal sulfides, and other metal containing compounds.

Metal oxides useful in this invention include at least one of the copper oxides, including copper peroxide ($CU_2O_3$), cupric oxide ($CuO$), and cuprous oxide ($Cu_2O$); zinc oxide ($ZnO$); the vanadium oxides, including vanadium oxide ($VO$), vanadium dioxide ($VO_2$), vanadium trioxide ($VO_3$), vanadium tetroxide ($VO_4$), vanadium pentoxide ($V_2O_5$); the chromium oxides, including chromium dioxide ($CrO_2$), chromium trioxide ($CrO_3$), chromic oxide ($Cr_2O_3$), chromous oxide ($CrO$); the manganese oxides, including manganous oxide ($MnO$), manganic manganous oxide ($Mn_3O_4$), manganese trioxide ($MnO_3$), manganese dioxide ($MnO_2$), manganese heptoxide ($Mn_2O_7$); the cobalt oxides, including cobaltous oxide ($CoO$), cobaltic oxide ($Co_2O_3$), cobalto cobaltic oxide ($Co_3O_4$); the iron oxides, including ferrous oxide ($FeO$), ferric oxide ($Fe_2O_3$), ferriferrous oxide ($Fe_3O_4$); the nickel oxides, including nickelous oxide ($NiO$), nickelic oxide ($Ni_2O_3$), nickelous nickelic oxide ($Ni_3O_4$), nickel peroxide ($NiO_2$), nickel super oxide ($NiO_4$); the palladium oxides, including palladium monoxide ($PdO$), palladium dioxide ($PdO_2$); the platinum oxides, including platinous oxide ($PtO$), platinum dioxide ($PtO_2$); the molybdenum oxides, including molybdenum dioxide ($MoO_2$), molybdenum sesquioxide ($Mo_2O_3$), molybdenum trioxide ($MoO_3$); the tungsten oxides, including tungsten dioxide ($WO_2$), tungsten trioxide ($WO_3$), tungsten pentoxide ($W_2O_5$), the cerium oxides, including cerium dioxide ($CeO_2$), cerous oxide ($Ce_2O_3$), and combinations thereof. The water insoluble metal oxides are appropriate for use in the method of this invention.

If desired, alkali metals or alkaline-earth metals, including sodium, potassium, rubidium, cesium, magnesium, calcium, and barium, may also be present in the catalyst or may be added to the catalyst.

After the molecular sieve has been treated with the metal and, possibly, formed into any desired shape, the metal treated molecular sieve may be finished by treatment in a humidified atmosphere. This "finish" treatment may include calcination or thermal treatment in air, or in an inert gas, at temperatures ranging from about 260° C. to about 925° C. for periods of time ranging from about 1 to about 48 hours or more, e.g., at about 538° C. for about 4 to about 6 hours. While subatmospheric or superatmospheric pressure can be employed for the thermal treatment, atmospheric pressure is useful simply for reasons of convenience.

Also included in this "finish" treatment is treating the catalyst with gas streams containing steam. Catalysts of improved selectivity and other beneficial properties, such as improved hydrothermal stability, can be obtained by subjecting the metal treated molecular sieve to at least one treatment with streams containing steam (hydrothermally treating the catalysts) at elevated temperatures ranging from about 260° C. to about 900° C., specifically from about 400° C. to about 850° C., more specifically from about 500° C. to about 700° C. The hydrothermal treatment may be accomplished in an atmosphere containing at least 20 ppm, 0 5%, 5%, 10%, 20% and even up to about 99% steam in air or some other suitable gas stream, such as nitrogen or some other gas which is essentially inert to the zeolite. Optionally, more than one hydrothermal treatment may be used, e.g., two, three, or more hydrothermal treatments at different temperatures, e.g., increasing temperatures, may be used. Typical steaming conditions are described in U.S. Pat. Nos. 4,429,176; 4,522,929; 4,594,146; and 4,663,492; each incorporated by reference herein. The calcination and hydrothermal treatments of the catalysts may be combined into one treatment step and conducted simultaneously.

The combination of the metal and the molecular sieve may be accomplished by contacting the molecular sieve with a metal, such as those mentioned above. In this method, the metal and the molecular sieve, and any binder or binder precursor desired, may be physically combined to produce a mixture and the mixture recovered and formed, such as by extrusion. If desired, water or another suitable carrier or solvent may also be added to the mixture. The formed material may be dried, and then finished in a humidified atmosphere as is more fully described herein.

As noted above, the catalytic reduction of nitrogen oxides is substantially effected by the use of the present process. By substantially effected is meant a conversion of greater than about 40, 80, 85, 90, 95, or even 99% or more of the nitrogen oxides and the ammonia in the exhaust gas to innocuous compounds, such as nitrogen, through the use of this process. This is also referred to herein as conversion of a substantial portion of the $NO_x$ and ammonia in the exhaust gas to innocuous compounds.

The catalysts of this invention will now be illustrated by examples. The examples are for illustrative purposes only and are not to be construed as limiting the scope of the invention, which scope is defined by this entire specification including the appended claims.

An unmodified, untreated hydrogen form ZSM-5 catalyst was used as the base catalyst for all of the following examples and was also used as the reference catalyst for comparison examples, where appropriate.

EXAMPLE 1

A ZSM-5 catalyst was prepared by the following method: 99 grams of calcined ZSM-5 were mixed in a muller with 20 grams of Dow Corning Q6-2230 silicone resin, and 6.5 grams of Dow Chemical Co. K75M Methocel™. To this dry blend, 52.9 grams of distilled water and 23.1 grams of E. I. DuPont de Nemours & Co. DBE (dibasic ester) were added while mulling. The mixture was then extruded to form 1/16 inch cylindrical extrudates. The extrudates were dried overnight at 120° C. and then calcined at 600° C. in 10% steam for 10 hours to produce a ZSM-5 containing catalyst. This catalyst is referred to herein as Catalyst A.

EXAMPLE 2

An iron containing ZSM-5 sample was prepared by the following method: 99 grams of calcined ZSM-5 were mixed in a muller with 20 grams of Dow Corning Q6-2230 silicone resin, 6.5 grams of Dow K75M Methocel™, and 3.2 grams of iron oxide, $Fe_2O_3$. To this dry blend, 52.9 grams of distilled water and 23.1 grams of DuPont DBE (dibasic ester) were added while mulling. The mixture was then formed into 1/16 inch cylindrical extrudates. The extrudates were dried overnight at 120° C. and then calcined at 600° C. in 10% steam for 10 hours to produce an iron containing catalyst, Catalyst B.

EXAMPLE 3

In this example, the SCR activity of Catalyst A is compared with the SCR activity of Catalyst B. The catalyst samples were evaluated using a fixed-bed quartz reactor operating between 250° and 550° C. The reactor was loaded with 2.75 grams of catalyst with inlet gases consisting of 500 ppm NO, 500 ppm $NH_3$, and 5% $O_2$ in a $N_2$ carrier flowing at a constant flow rate of 1,000 cc/min. The effluent from the reactor was continuously monitored by FTIR (Fourier Transform Infrared) analysis. Catalyst activity results are summarized below in Table 1.

TABLE 1

| | Net NO Conversion, % | |
|---|---|---|
| Temperature, °C. | Catalyst A | Catalyst B |
| 550 | 71% | 92% |
| 454 | 74% | 96% |
| 398 | 72% | 96% |
| 343 | 60% | 96% |
| 250 | 25% | 65% |

EXAMPLE 4

An iron containing ZSM-5 sample was prepared by the following method: 99 grams of calcined ZSM-5 were mixed in a muller with 20 grams of Dow Corning Q6-2230 silicone resin, 6.5 grams of Dow K75M Methocel™, and 0.32 grams of iron oxide, $Fe_2O_3$. To this dry blend, 52.9 grams of distilled water and 23.1 grams of DuPont DBE (dibasic ester) were added while mulling. The mixture was then formed into 1/16 inch cylindrical extrudates. The extrudates were dried overnight at 120° C. and then calcined at 600° C. in 10% steam for 10 hours to produce an iron containing catalyst, Catalyst C.

EXAMPLE 5

In this example, the SCR activity of Catalyst A is compared with the SCR activity of Catalyst C. The catalyst samples were evaluated using a fixed-bed quartz reactor operating between 250° and 550° C. The reactor was loaded with 2.75 grams of catalyst with inlet gases consisting of 500 ppm NO, 500 ppm $NH_3$, and 5% $O_2$ in a $N_2$ carrier flowing at a constant flow rate of 1,000 cc/min. The effluent from the reactor was continuously monitored by FTIR (Fourier Transform Infrared) analysis. Catalyst activity results are summarized below in Table 2.

TABLE 2

| | Net NO conversion, % | |
|---|---|---|
| Temperature, °C. | Catalyst A | Catalyst C |
| 550 | 71% | 84% |
| 454 | 74% | 86% |
| 398 | 72% | 87% |
| 343 | 60% | 82% |
| 250 | 25% | 40% |

We claim:

1. A method for treating an exhaust gas comprising $NO_x$ and ammonia, said method comprising directing the exhaust gas along with a source of oxygen over a catalyst under treating conditions effective for the selective catalytic reduction of $NO_x$; said catalyst comprising a molecular sieve which has been physically mixed with a metal and a binder or a binder precursor under contacting conditions effective to produce a metal loading of about 0.01 wt. % to about 5 wt. % with reference to the molecular sieve; said molecular sieve being at least one selected from the group consisting of ZSM-5, ZSM-11, ZSM-12, ZSM-21, ZSM-22, ZSM-23, ZSM-35, ZSM-38, ZSM-48, ZSM-58, and combinations thereof; said binder or binder precursor comprising at least one selected from the group consisting of titania, zirconia, and silica; said process further comprising finished said catalyst in a humidified atmosphere under conditions effective to produce improved hydrothermal stability; the metal being selected from the group consisting of at least one of the Groups of the Periodic Table of IIIA, IB, IIB, VA, VIA, VIIA, VIIIA, and combinations thereof.

2. The method according to claim 1 wherein the molecular sieve comprises ZSM-5.

3. The method according to claim 1 wherein the metal loading of the catalyst is at least about 1.5 wt. % with reference to the molecular sieve.

4. The method according to claim 3 wherein the metal loading of the catalyst is less than about 3 wt. % with reference to the molecular sieve.

5. The method according to claim 1 wherein the treating conditions comprise a temperature of about 200° C. to about 1,000° C., a pressure of about 5 to about 500 psia, and a gas hourly space velocity (GHSV) of about 1,000 to about 500,000 $hr^{-1}$.

6. The method according to claim 1 wherein the source of oxygen comprises air.

7. The method according to claim 1 wherein the metal is selected from at least one of the oxides of metals of Groups of the Period Table IIIA, IB, IIB, VA, VIA, VIIA, VIIIA and combinations thereof.

8. The method according to claim 1 wherein the metal is selected from at least one of the water insoluble oxides of copper, zinc, vanadium, chromium, manganese, cobalt, iron, nickel, rhodium, palladium, platinum, molybdenum, tungsten, cerium and mixtures thereof.

9. The method according to claim 1 wherein the metal comprises iron oxide.

10. The method according to claim 1 wherein the binder is substantially free of alumina, and wherein the molecular sieve constitutes about 20 to about 90 weight percent of the finished catalyst.

11. The method according to claim 1 wherein the humidified atmosphere comprises about 20 ppm to about 99% steam at about 260° C. to about 900° C.

* * * * *